US005266963A

United States Patent [19]

Carter

[11] Patent Number: 5,266,963

[45] Date of Patent: Nov. 30, 1993

[54] INTEGRATED ANTENNA/MIXER FOR THE MICROWAVE AND MILLIMETRIC WAVEBANDS

[75] Inventor: Stephen J. Carter, Bristol, England

[73] Assignee: British Aerospace Public Limited Company, London, England

[21] Appl. No.: 644,739

[22] Filed: Jan. 23, 1991

Related U.S. Application Data

[63] Continuation of Ser. No. 512,527, Apr. 18, 1990, abandoned, which is a continuation of Ser. No. 342,465, Mar. 21, 1989, abandoned, which is a continuation of Ser. No. 120,188, Oct. 16, 1987, abandoned, which is a continuation of Ser. No. 874,096, May 23, 1986, abandoned.

[30] Foreign Application Priority Data

Jan. 17, 1986 [GB] United Kingdom ................. 8601074

[51] Int. Cl.[5] .......................... H01Q 1/50; H04B 1/26

[52] U.S. Cl. .................................... 343/850; 455/325; 455/327

[58] Field of Search ................................ 455/325-327, 455/330, 333, 318-319, 293; 343/850

[56] References Cited

U.S. PATENT DOCUMENTS

| | | | |
|---|---|---|---|
| 4,038,742 | 8/1977 | Kimball et al. | 29/600 |
| 4,232,401 | 11/1980 | Chang et al. | 455/328 |
| 4,276,655 | 6/1981 | Kraemer et al. | 455/327 |
| 4,291,415 | 9/1981 | Buntschuh | 455/328 |
| 4,392,251 | 7/1983 | Hallford | 455/327 |
| 4,411,022 | 10/1983 | Clifton et al. | 455/327 |
| 4,430,758 | 2/1984 | Snyder | 455/227 |
| 4,461,039 | 7/1984 | Hersman | 455/326 |
| 4,607,394 | 8/1986 | Nightingale | 455/327 |

*Primary Examiner*—Gregory C. Issing
*Attorney, Agent, or Firm*—Cushman, Darby & Cushman

[57] ABSTRACT

A microwave/millimetric receiver of the kind in which a dielectric lens focusses incoming radiation on to an integrated antenna/mixer supported by a dielectric substrate. In one embodiment the antenna/mixer comprises a slot antenna and diode means coupled thereto for mixing the received signal with a local oscillator signal to form an IF signal. The local oscillator signal may be irradiated on to the antenna/mixer to be picked up by a crossed slot antenna or the local oscillator signal may be directly injected into the antenna/mixer circuit say via a microstrip line. In an alternative embodiment, the slot antenna is replaced by a dipole and a local oscillator signal is directly injected into the antenna/mixer via a coplanar line.

3 Claims, 13 Drawing Sheets

Fig.9
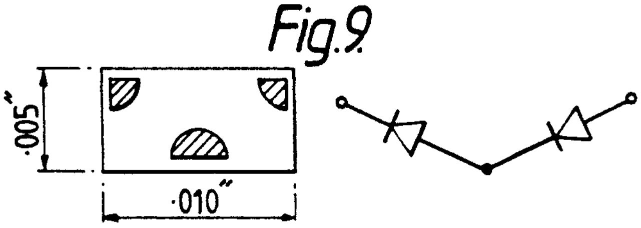
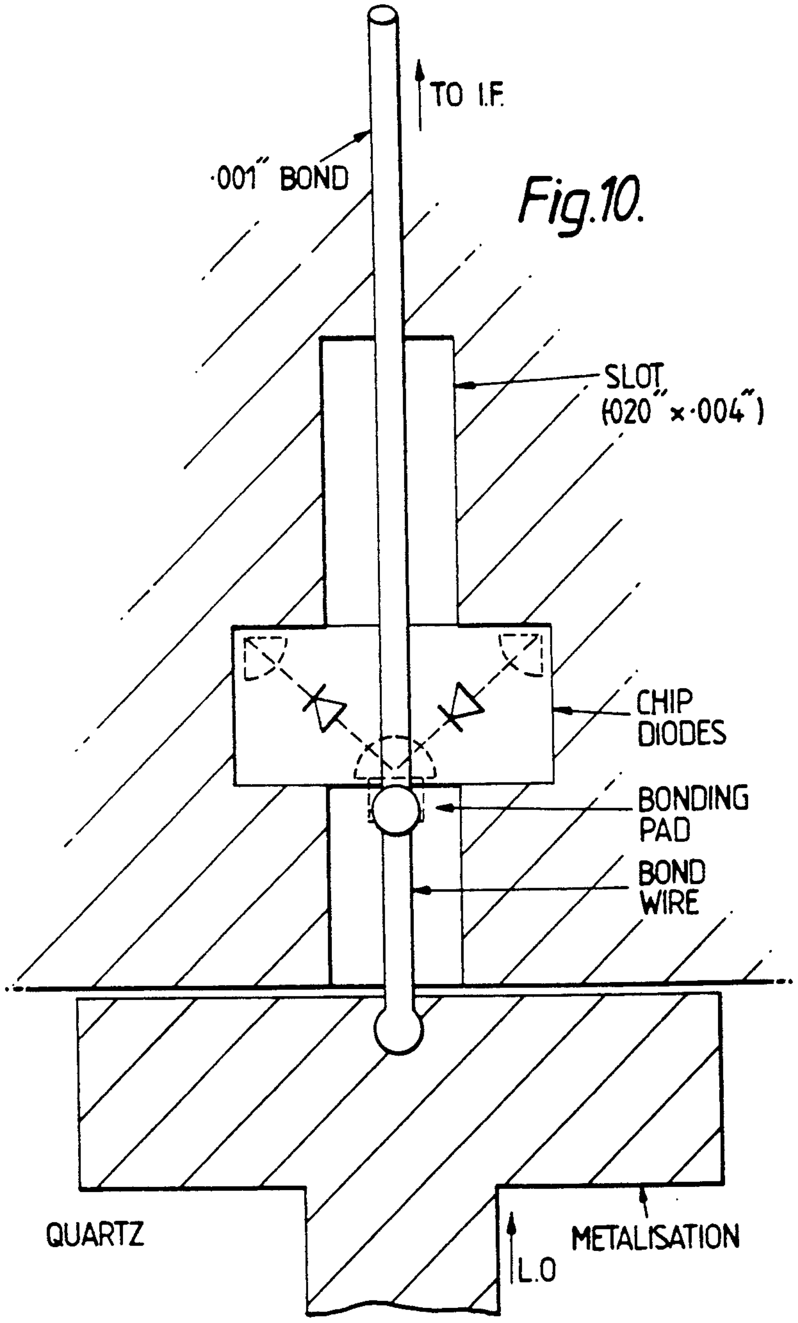
Fig.10.

| | TYPE | FUNDEMENTAL | HARMONIC |
|---|---|---|---|
| Fig.15. | DOUBLE BALANCED SLOT WITH INJECTED L.O. | 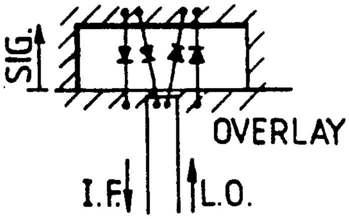  | 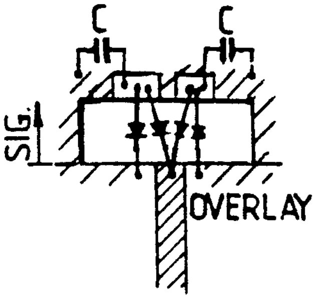  |
| Fig.16. | BALANCED SLOT WITH INJECTED L.O. | 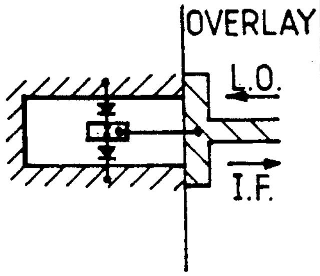  | AS FUNDEMENTAL |
| Fig.17. | BALANCED SLOT WITH INJECTED L.O. | 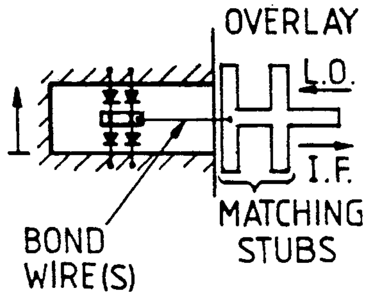  | 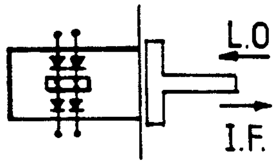  |
| Fig.18. | SINGLE-SIDED SLOT WITH INJECTED L.O. | 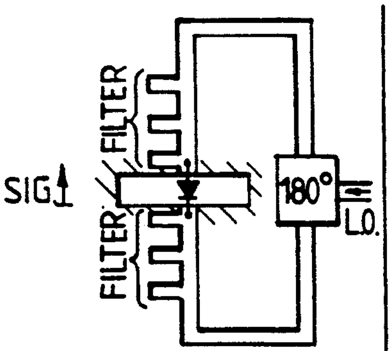  OVERLAY COMPLETELY COVERS PERIFERY OF SLOT MICROSTRIP LINES DEPOSITED ON OVERLAY | 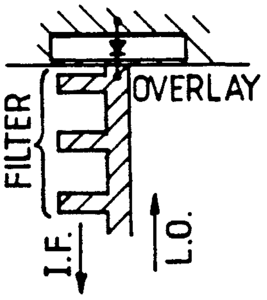  |

INTEGRATED ANTENNA/MIXER FOR THE MICROWAVE AND MILLIMETRIC WAVEBANDS

This is a continuation of application Ser. No. 07/512,527, filed on Apr. 18, 1990, which was a FWC of Ser. No. 07/342,465, filed Mar. 21, 1989, which was a FWC of abandoned upon the filing hereof Ser. No. 07/120,188, filed Oct. 16, 1987, which was a FWC of Ser. No. 06/874,096, filed May 23, 1986 all of which is abandoned.

This invention relates to planar integrated antenna/-mixers for the microwave and millimetric wavebands and to receivers comprising such antenna/mixers.

BACKGROUND OF THE INVENTION

In a superhet receiver, a received RF signal is first transformed from a linear or circular polarised wave (as transmitted) to a guided wave or a travelling wave in a suitable transmission medium by the use of an antenna. The travelling wave is then applied to a mixer circuit where it is mixed with a local oscillator signal to form an intermediate frequency (IF) signal. The IF frequency may equal the simple difference between the RF and local oscillator frequencies or the difference between the RF frequency and a harmonic of the local oscillator frequency, which being dependent upon whether a 'fundamental' or a 'harmonic' mixer is used.

In a conventional receiver the antenna and mixer are two separate entities coupled via a transmission medium but it has been proposed, in the interests of improved ruggedness, simplification and reduced cost, to integrate the mixer into the antenna structure. In this proposal, various fundamental mixers, e.g. balanced and dual balanced, are suggested. Essentially, however, each comprises a pair of crossed dipoles mounted on, or in very close proximity to, a high dielectric support body, with a mixer diode ring connected between the constituent limbs of the dipoles. The RF and local oscillator signals with respective linear polarisations orthogonal one to another are radiatively coupled to respective ones of the dipoles. It has also been proposed to make a harmonic mixer in which a planar dipole is mounted upon a dielectric body with at least one diode connecting the dipole limbs and in which the local oscillator signal is 'directly injected' into the mixer, i.e. in which the local oscillator signal is fed to the mixer via a particular form of conductive link instead of being radiated onto the mixer.

SUMMARY OF THE INVENTION

According to one aspect of the invention, there is provided an electromagnetic radiation receiver comprising a dielectric substrate and, formed on a face of the substrate, a planar integrated antenna/mixer circuit, the receiver further comprising focussing means positioned for focussing received RF radiation onto the antenna/mixer circuit and local oscillator signal supply means for making a local oscillator signal available to the antenna/mixer circuit, and the antenna/mixer circuit comprising a slot antenna, diode means connected to the antenna for mixing the RF radiation received by the antenna with the local oscillator signal made available to the antenna/mixer circuit to form an IF signal, and output means for extracting said IF signal from the antenna/mixer circuit.

The focussing means may comprise a dielectric lens. Preferably, there are a plurality of said integrated antenna/mixer circuits arrayed over said substrate face.

In some embodiments to be described herein, the local oscillator signal supply means is operable to irradiate the antenna/mixer with electromagnetic radiation at the local oscillator signal supply frequency and with a polarisation direction orthogonal to that of the received RF radiation, while the, or each, antenna/mixer circuit comprises a pair of crossed slot antennae elements operable for forming respective electrical signals corresponding to the RF radiation and local oscillator radiation received by the antenna/mixer circuit.

In one of the above-mentioned embodiments, the or each antenna/mixer circuit comprises a cruciform aperture in a conductive layer formed on the substrate surface and the diode means comprises first and second mixer diodes, the anode of the first diode and the cathode of the second diode being connected to the conductive layer near respective ones of two adjacent re-entrant corners of the cruciform aperture and the cathode of the first diode and the anode of the second diode being connected via respective capacitors to the conductive layer near respective ones of the other two re-entrant corners of the aperture such that, in each case, the diode is connected via a capacitor between two diagonally opposite ones of said re-entrant corners, said output means being coupled to the cathode of the first diode and the anode of the second diode so as to see a source impedance comprising that of the two diodes in parallel.

This embodiment effectively constitutes a single balanced mixer—it may be self biassed, i.e. where the rectified component of the local oscillator signal across each diode provides all the bias for the diode or, if insufficient drive is available from the local oscillator, a further capacitor can be interposed between the conductive layer and the cathode of the second diode and the negative side of a separate bias source can be connected via a resistor to this cathode.

In a second of these embodiments, where the mixer is a double-balanced mixer, a conductive layer with a cruciform aperture is provided as before but the diode means comprises four diodes connected in a series ring with two opposite ring interconnections connected to the conductive layer near respective diagonally opposite re-entrant aperture corners and the other two ring interconnections connected to the output means and, via respective capacitors, to the conductive layer near respective ones of the other two re-entrant aperture corners, each of the two slot antennae formed by the cruciform aperture thus, in effect, having two diodes parallel connected across it and the source impedance seen by the output means comprising that of the four diodes in parallel. Supplementary biassing may again be achieved by interposing a capacitor at one of the direct diode ring to conductive layer connections and connecting a bias source via a resistor to the diode side of this capacitor.

In further embodiments to be described herein the local oscillator signal is, in effect, directly injected into the antenna/mixer circuit, i.e. instead of irradiating the circuit with the local oscillator signal and having a crossed slot, a single slot picks up the RF radiation while the local oscillator signal is coupled to the mixer via some form of conductive means.

In one such embodiment, the antenna slot is constituted by a rectangular aperture in a conductive layer on the substrate surface and the local oscillator signal is fed via a microstrip line to a position near one end of the aperture, at which position the line is formed with one or more capacitive stub(s) for impedance matching purposes, and a bond wire is passed from the line over the aperture in the direction of its length, the bond wire being connected via respective diodes to the conductive layer near the middle of each of the two long sides of the aperture such that the diodes are connected in series across the slot and the bond wire being connected, via a capacitor, to the conductive layer at a position spaced from the other end of the aperture.

The microstrip line and the stub could be formed on an insulating layer overlaying the conductive layer.

In a modification of the above embodiment, constituting a double-balanced mixer, the slot aperture has two diodes connected in parallel across it and two more diodes connected between one side of the slot and a microstrip local oscillator injecting line terminating close to the other side of the slot. This modification may be further modified to form a so-called 'harmonic' mixer embodiment by making all the diode to conductive layer connections at said one side of the slot via two capacitors.

In yet a further modification, a single diode is connected across the slot and the local oscillator signal is applied via a microstrip line comprising filter forming stubs.

According to another aspect of the invention there is provided an integrated antenna/mixer circuit comprising a planar dipole antenna mounted upon a high resistivity body and having, connected between the limbs of the dipole antenna, a mixer comprised of at least one diode matched in impedance to the radiation impedance of the antenna, connective link means connected to the mixer, and a reference signal source connected to the mixer via said connective link means, said connective link means comprising a coplanar line terminating near the middle of the dipole and the mixer comprises two mixer diodes connected between respective limbs of the dipole and respective ones of the two outer elements of the coplanar line, and two more mixer diodes each connected between the inner element of the coplanar line and a respective one of said dipole limbs, the antenna/mixer circuit further comprising resistive connection means for applying a diode bias supply to the two limbs of the dipole and d.c. but not RF or IF signal passing means linking the inner and outer elements of the coplanar line.

BRIEF DESCRIPTION OF THE DRAWINGS

For a better understanding of the invention, reference will now be made, by way of example, to the accompanying drawings, in which:

FIG. 9 shows a possible configuration for a particular diode component usable in this invention.

FIG. 10 show a proposed mixer at 95 GHz.

FIG. 1 shows the basic structure of a previously proposed receiver which consists of a lens with dielectric substrate at its focal plane. The signal is incident on the front of the lens, where it is focussed through the lens, and the thickness of the substrate opposite to the lens. The back face of the substrate carries an array of crossed-dipole antenna mixer circuits. The angle of incidence of the signal defines on which one of the dipoles it is incident. One way of applying the local oscillator to each individual dipole is to use a polarising grid as shown in the diagram. The local oscillator can then be radiated into the array at 90° to the signal.

In FIG. 2 one of the antenna/mixer circuits of the FIG. 1 receiver is shown in more detail. The direction of IF current flow is shown by the dotted lines. The lower dipole is split so that the IF current can feed the two inputs of a long-tailed pair amplifier, which is mounted on the dipole. The IF current flows through all the diodes which are effectively in series at the IF frequency, thereby presenting the required high input impedance to the long-tailed pair amplifier.

In order that d.c. current can flow through the diodes it is necessary that connections be made to the dipoles. In order that this may be done without affecting the antenna pattern of driving point impedance resistive connections are made at the ends of the dipole.

In general, when designing a mixer, in order to minimise the losses it is necessary to match the signal, L.O. and IF amplifier to the impedance presented by the mixer at the appropriate ports. In general the impedances will all be a function of local oscillator drive level and any d.c. bias current that may be used. A mixer diode will present a junction resistance of approximately 100 to 400 Ω (dependant on the size of the junction and the operating conditions). This resistance is then modified by any parasitics such as junction capacitance and bond wire inductance.

Figure 1:
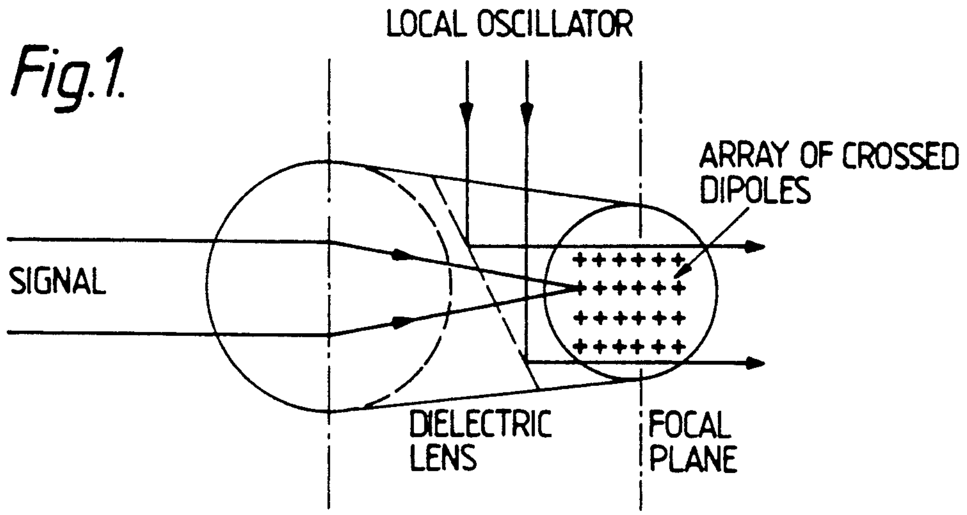
FIG. 1 shows a previously proposed structure of an array of crossed dipoles fed from a lens. Incorporated in the lens is a polarising grid allowing introduction of the local oscillator.
Figure 2:
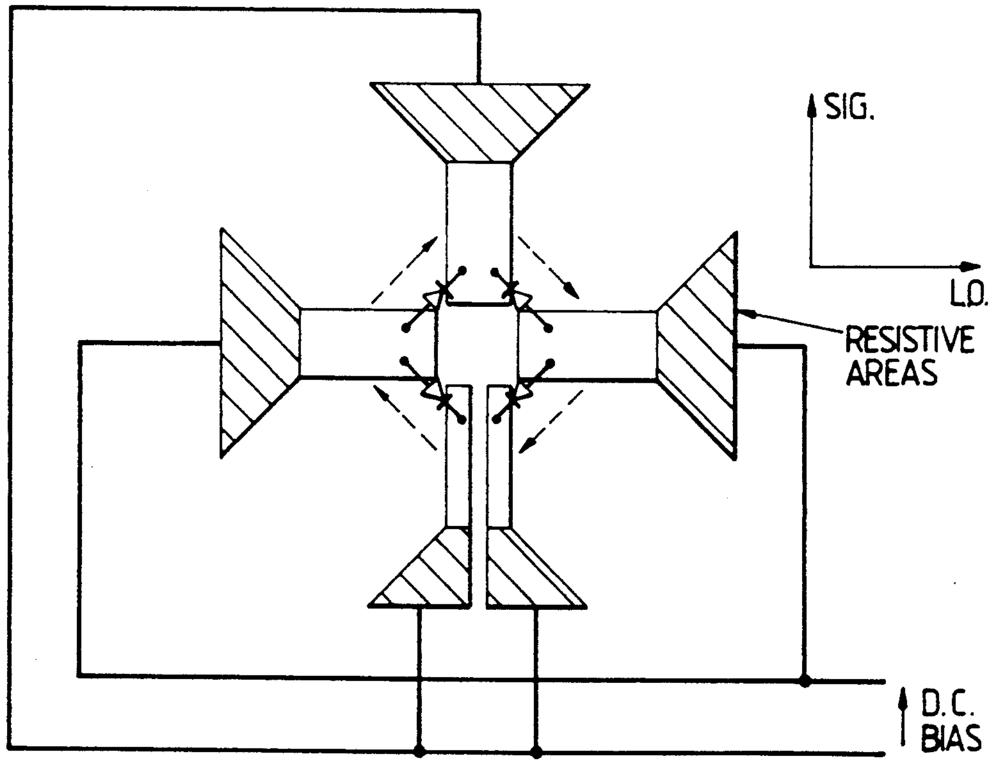
FIG. 2 shows a previously proposed diode configuration of the basic mixer using a crossed dipole.

In some embodiments of the invention to be described, the dipoles of FIGS. 1 and 2 are replaced by slots. At resonance a slot presents an impedance with a real part approximating to 400 Ω, and dropping as the frequency is increased. Below resonance a slot is inductive, and just above resonance it is capacitive.

In the case of a dipole the resistance at resonance is about 30 ohms, and this increases with increasing frequency. The reactance is capacitive below resonance and inductive in the region immediately above resonance.

The behaviour of both slot and dipole is more complicated than that of a single tuned circuit, and complete analysis is required in order to predict the impedance at any specific frequency.

Nevertheless a clue to the broad band response of a slot mixer is given by the negative reactance slope of the slot in the region of resonance, which tends to cancel the position slope of the mixer diode reactance.

The real part of the mixer diode impedance (and to a lesser degree the junction capacitance) are also functions of the bias current flowing through the mixer diodes. The bias current has two components:

1. A current which may flow due to rectification of the local oscillator. (For this current to flow the mixer diode must form part of a continuous d.c. circuit).
2. An additional d.c. bias which may be applied to the mixer diode by means of an external current generator. If a mixer operates purely by rectification of the local oscillator it is termed 'self-biassed'. A mixer using an external current generator is termed 'externally biassed'.

At low frequencies where diode parasitics are small, e.g. typical IF frequencies, the mixer diode impedance approximates to RJ (the junction resistance). Under normal operating conditions the resistance of a mixer diode is approximately 100 to 200Ω at 10 GHz. At 90 GHz smaller junctions are necessary and the resistance is likely to be higher (200 to 400Ω. In matching the mixer diodes to IF amplifiers it is helpful if a diode configuration can be chosen which approximates to the IF amplifier input impedance. IF amplifiers can be divided into three groups:

1. Those designed specifically to operate with a topical single balanced mixer:
   There are at least two commercially available amplifiers on the market which are designed to give optimum performance when fed from an impedance of 100 to 200Ω. This impedance is optimum for either a single mixer diode impedance (or two in parallel) depending on the operating conditions.
2. Those designed for very broad bandwidths using microwave intermediate frequencies: Very many manufacturers produce IF amplifiers optimised for a 50 ohms input impedance. This is for the obvious reason that most co-axial systems use a 50Ω transmission medium. In practise, were it necessary to produce the optimum in broadband matching into a microwave transistor or f.e.t., an even lower impedance than 50Ω may be desirable from an amplifier design point of view. Thus, in the specific case of a Radiometer, where the ultimate in low noise figure and broad bandwith is required, it would be advantageous to have as low an IF impedance from the mixer as is realisable, and then to match directly into the f.e.t. IF amplifier.
3. Those designed for differential inputs and small size: In the case of a very small size amplifier, as is required if it is mounted on the dipole, a long tailed pair is suitable because no capacitors are required. In order to provide an equal current split through the long tailed pair, emitter resistors are normally used, which tend to raise the input impedance of the amplifier. Thus the long tailed pair works best from an input impedance of about 1 to 4 Kohms. This can be achieved by designing the mixer such that all the diodes are effectively in series at IF (see FIG. 2).

In the case of a radiatively coupled local oscillator the impedance matching problem at the LO port of a mixer is exactly the same as for matching the signal. In the case of an injected local oscillator this must be injected from a transmission line, the allowable range of impedance being determined by the transmission medium.

A suitable transmission medium for a local oscillator signal should ideally have the following features:

1. Ease of interfacing with the local oscillator.
2. Ease of manufacturing the necessary couplers, splitters, etc., for applying the local oscillator signal to an array.

While other media are possibilities, it is considered that the most suitable is microstrip. This allows for manufacture of the necessary splitters and, if dielectric resonators are used, the oscillator could be manufactured in the same medium.

The upper limit of microstrip impedance is of the order of 120Ω . If higher impedances are required (in order to match to the mixer diodes) then these may be realised by other media, e.q. "coplanar lines" or "coplanar strips". However, their use complicates the integration problems of splitters and local oscillator.

In addition to considering the d.c. current through the mixer diodes, a further factor of importance is the IF current flow. For a fundemental mixer, if the signal and local oscillator instantaneous voltages are in phase, at a specific diode the effect is to increase the current already flowing through the diode. If these voltages are in antiphase then the effect is to reduce the current flowing through the diode.

1. Slot Mixers Using Radiated Local Oscillator

Figure 3:
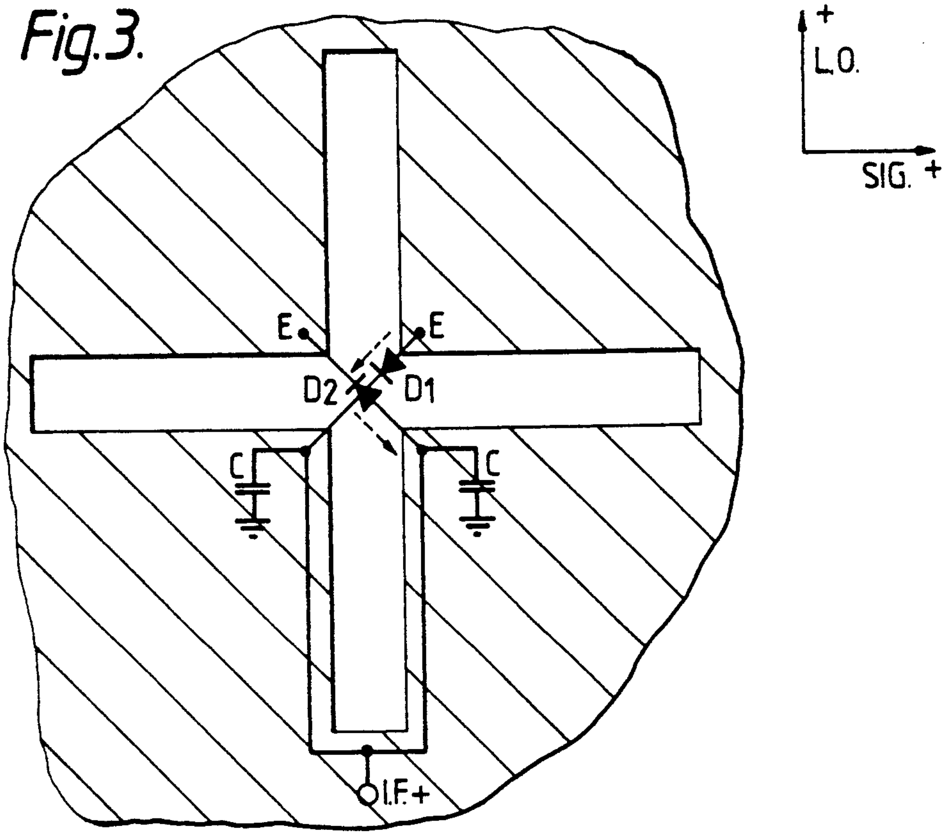
FIG. 3 shows the diode configuration of a basic single balanced slot mixer.
Figure 4:
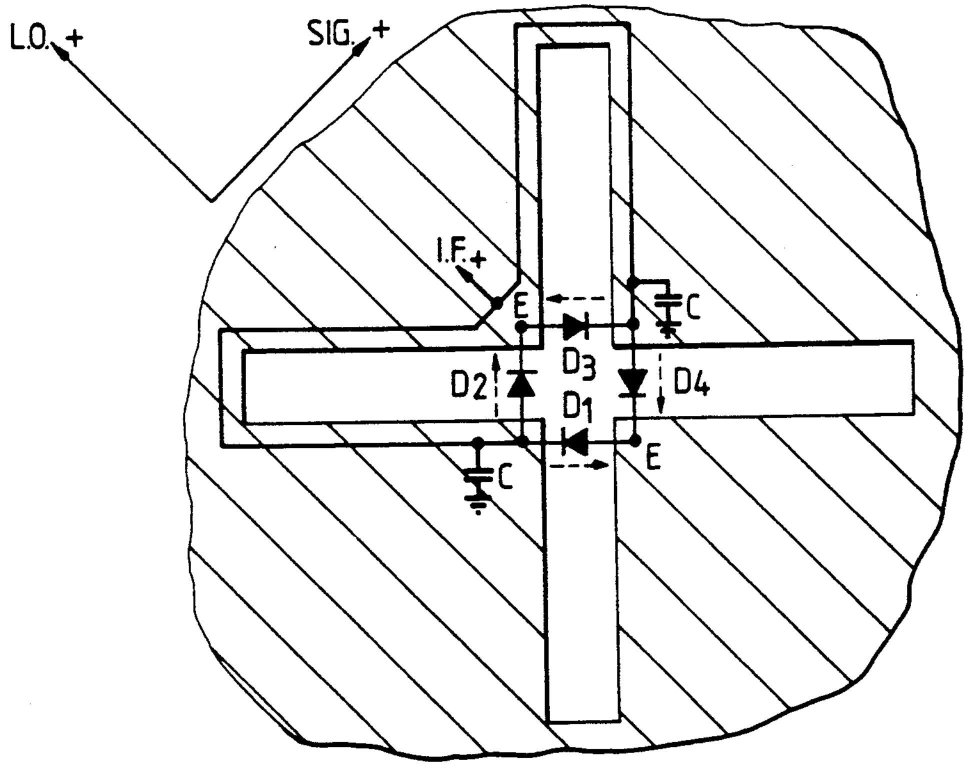
FIG. 4 shows the diode configuration of a basic double balanced slot mixer.

Two embodiments of the invention in which the local oscillator signal is radiated onto the antenna/mixer as in FIG. 1 but in which slot antennae are used are shown in FIGS. 3 and 4. Both examples use a crossed slot antenna with signal and local oscillator on orthogonal polarisations. However, when direction of IF current flow through the diodes is considered, it can be appreciated that the single balanced mixer of FIG. 3 requires that the signal polarisation be parallel to the dipole, whereas the double balanced mixer of FIG. 4 requires that the signal polarisation be at 45° to the dipole.

The single balanced mixer of FIG. 3 would work in a self-biassed mode as the diodes are both in the same direction from a point of view of d.c. current flow. However, if insufficient driver were available from the local oscillator the easiest way of applying a d.c. bias would be to connect the cathode of D2 to earth via a capacitor rather than directly earthing it. A resistor could then be connected to the cathode of D2 and a negative supply in order to bias both the diodes.

From the point of view of matching, the signal and local oscillator ports are identical, and it is considered that each slot effectively has one diode connected across it. At the IF port there are effectively two diodes in parallel, thus presenting a manageable IF impedance of half the diode resistance.

The double balanced circuit of FIG. 4 has effectively two diodes in parallel across each slot, and four diodes in parallel at IF. This is therefore the optimum type of circuit for driving a broad-band microwave IF. Unfortunately the match of the circuit to signal and local oscillator (theoretical) is not as good at millimetre wave frequencies as is the single balanced mixer.

The double balanced mixer can be operated in an externally biassed mode in the same way as the single balanced mixer by applying bias at the cathode of either D2 or D4.

Figure 5:
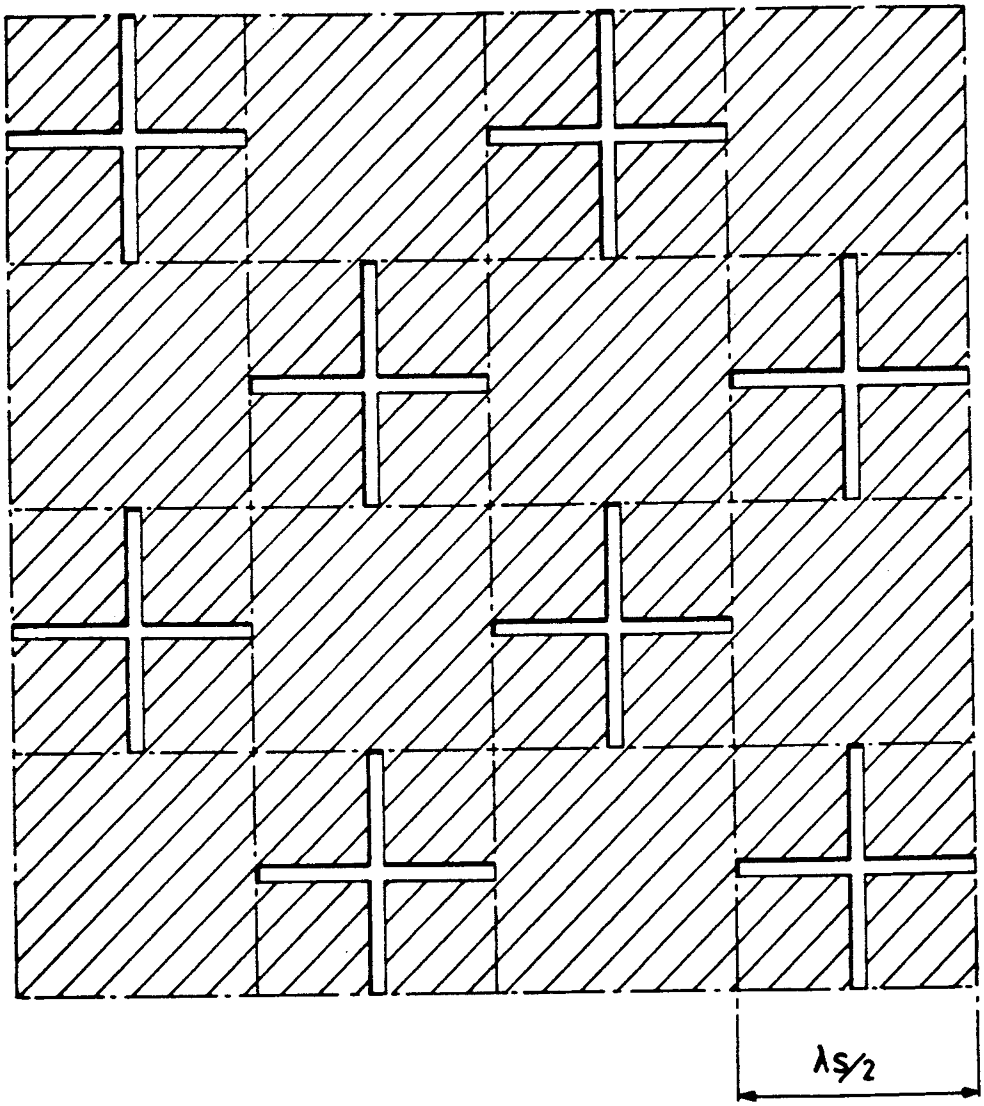
FIG. 5 shows the large metallised areas available for mounting components, or for interconnections, when using a slot array.

The mixers of FIGS. 3 and 4 could be simplified in production by the use of dielectric overlays, and a second metal deposition. FIG. 5 shows how an array could be implemented indicating the space available for IF amplifiers and interconnections.

Figure 6:
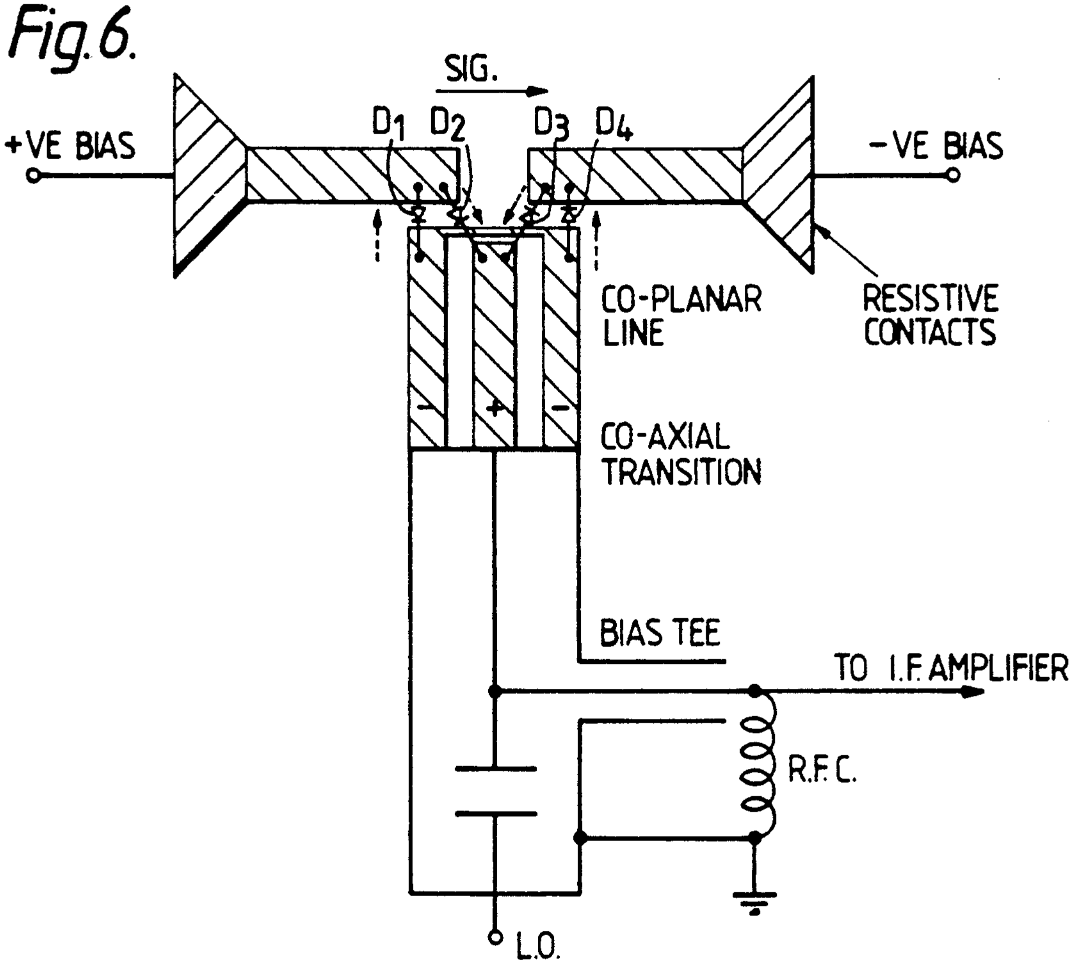
FIG. 6 shows how a double balanced dipole mixer can be realised with a directly fed local oscillator on coplanar line.

A further embodiment of the invention constituting double balanced dipole mixer with directly injected local oscillator is shown in FIG. 6. This uses coplanar line to feed in the local oscillator. In order to allow diode conduction the circuit would require resistive connections to the ends of the dipoles in order to apply the necessary external bias. A d.c. connection would also be necessary across the coplanar line (inner to outer) in such a way that it does not short the microwave of IF signals. A possible method of IF extraction would be to connect the coplanar line to a co-axial transition and then to use a co-axial bias tee with an RF choke connected across it. The output from the bias tee would then feed an IF amplifier.

For this polarity of the diodes the IF output impedance is effectively equal to one diode. If the polarities of diodes D1 and D3 are reversed and a d.c. return is provided in the coplanar line then the circuit could be used to drive a differential amplifier mounted on the dipole.

A fourth possibility is to reverse the direction of diodes D1 and D4. This may allow the use of a low output impedance for microwave IFs, but careful consideration should begiven to separation of the IF from the other signals.

Embodiments of the invention in which both slot mixers and direct local oscillator signal injection are used are shown in FIGS. 7 to 18. In the FIG. 7 configuration, two mixer diodes are connected in series across the slot. The local oscillator is injected via a transmission line (microstrip) at the end of the slot and is applied via a bond wire to the point where the diodes are joined. The microstrip line will require the addition of a parallel capacitive stub at the point where the bond wire is joined. The effect of this capacitor and the series inductance of the bond wire is to match the microstrip line (50Ω) to the parallel impedance of two mixer diodes at the local oscillator frequency.

While the local oscillator sees two diodes in parallel, the signal (appearing across a slot impedance of approximately 400Ω) sees two mixer diodes in series. The IF impedance of the circuit is that of two mixer diodes in parallel. It is considered that mixers implemented in this manner would be ideal for use in a linear array. If used at 35 or 90 GHz the local oscillator splitter circuitry could be made using microstrip on quartz. This substrate could be either glued to the alumina substrate containing the slot or, alternatively, it may be possible to use a thick sputtered layer of quartz with a metalised pattern on top. On the opposite side of the slot an alumina substrate could be attached in order to accomodate 50Ω lines to off the substrate amplifiers (if a microwave IF were used) or, alternatively, there may be room for narrower bandwidth amplifiers or monolithic or hybrid technology to be bonded directly to the existing alumina substrate.

Figure 7:
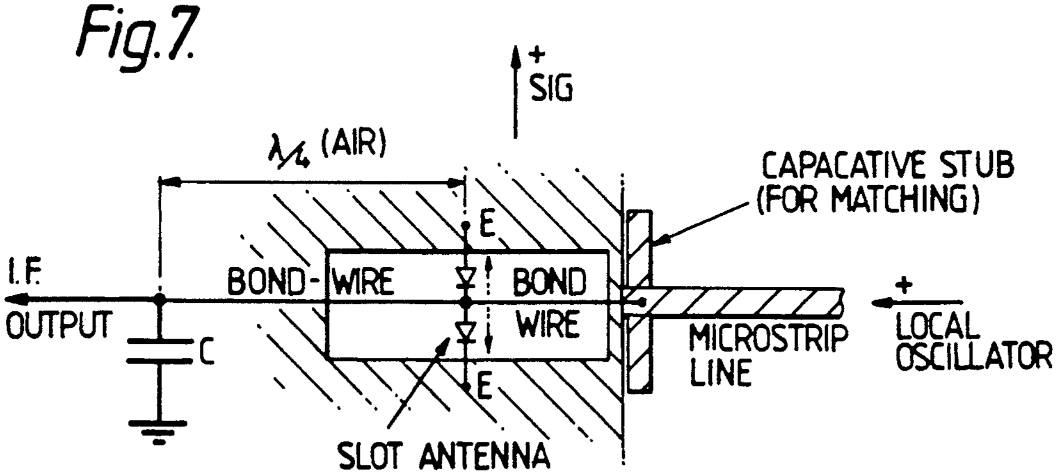
FIG. 7 shows structure for a single balanced slot mixer using directly injected local oscillator.
Figure 8:
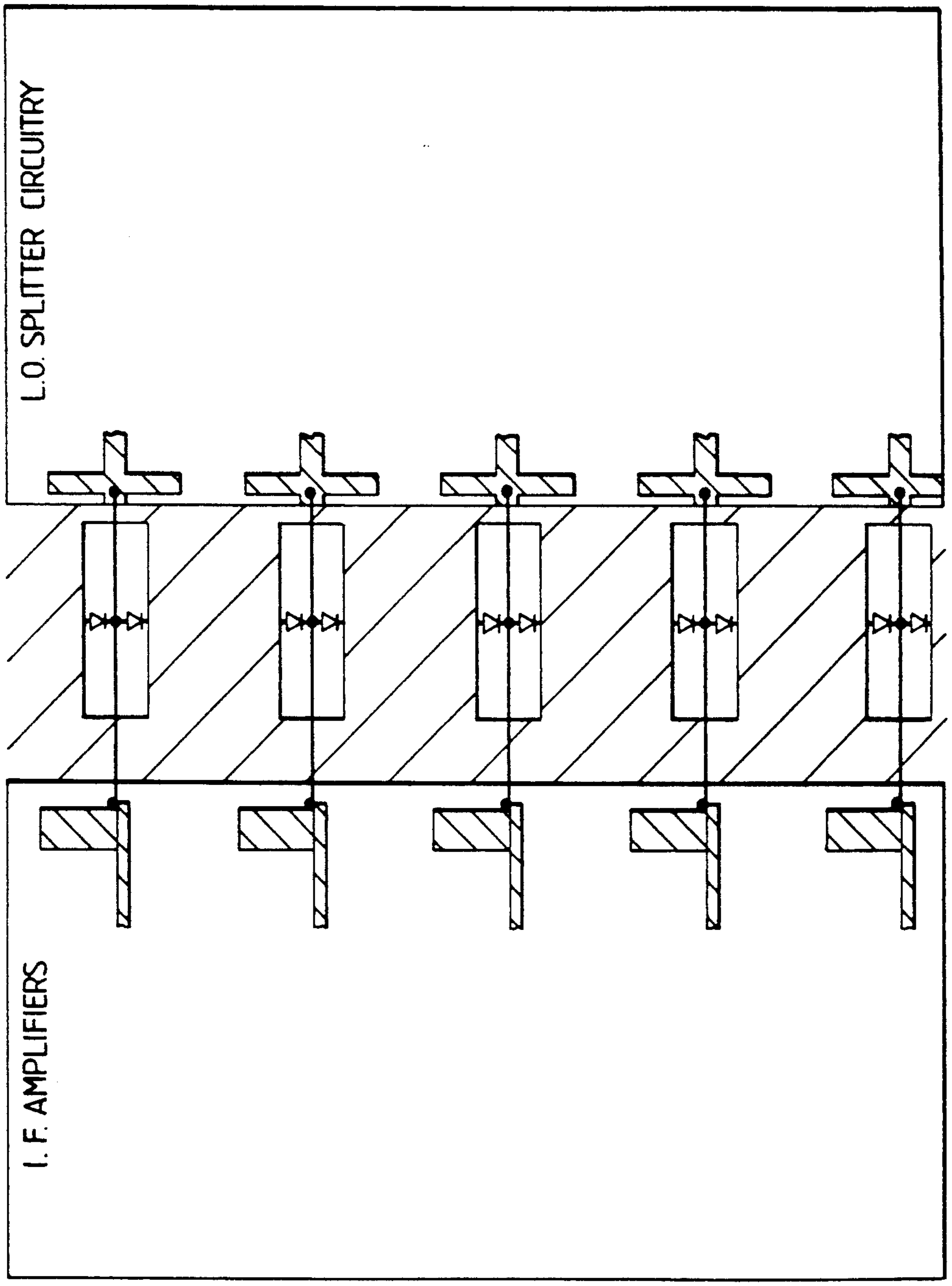
FIG. 8 shows how the slot mixer, with L0 injection, can be made into a linear array.
Figure 11:
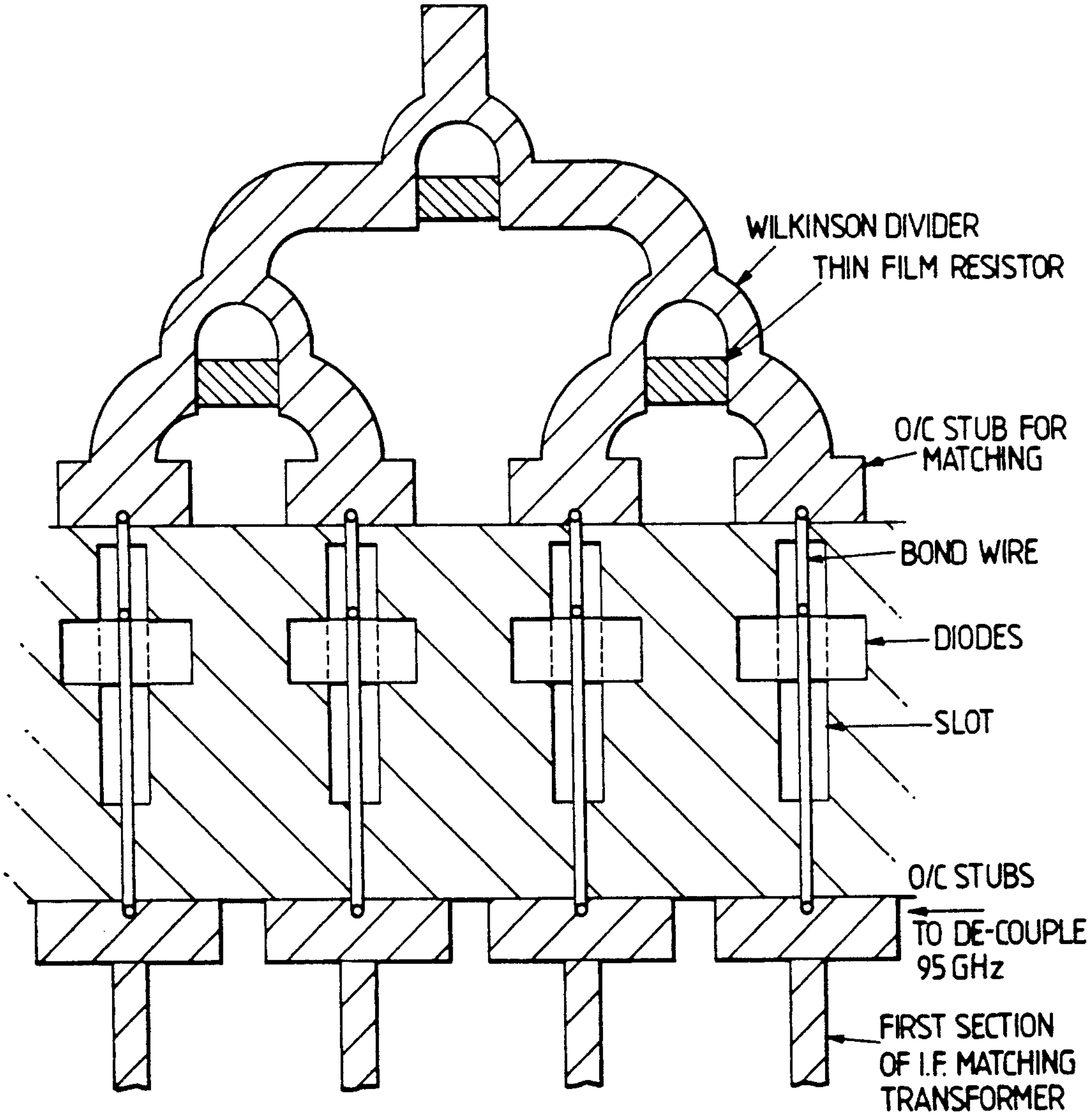
FIG. 11 shows a linear array of 95 GHz mixers, and the local oscillator splitting and matching circuitry.
Figure 12:
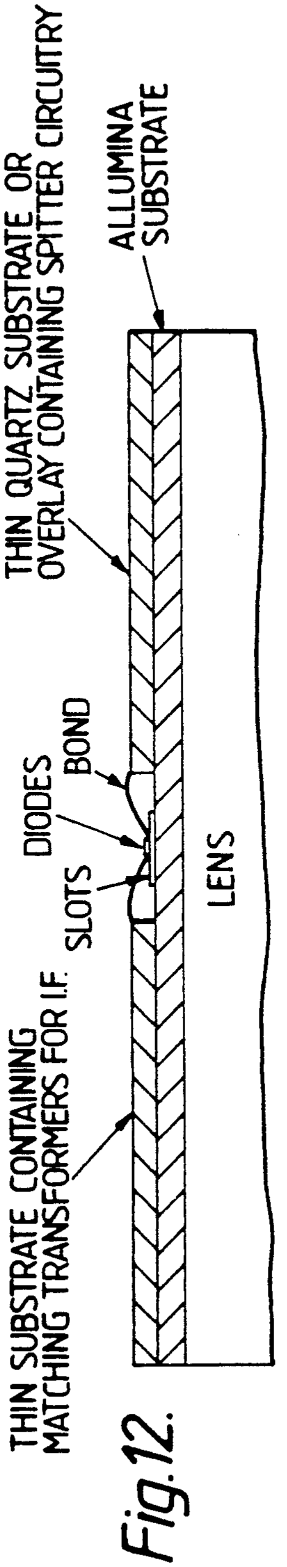
FIG. 12 shows how the overall assembly is interfaced with the lens.

Two possible applications of the FIG. 7 concept are:

1. Linear array of radiometric mixers at 94 GHz (10% bandwidth) designed to feed a microwave IF.

2. A linear array of receivers at 5-10 GHz (signal frequency), and designed to feed IF amplifiers at VHF.

In the case of the first application it is considered that a suitable diode would be the Mullard CAY 19 supplied in a form which has two diodes mounted on a 0.005"×0.01" chip as shown in FIG. 9.

In relation to the first application, for a 10:1 aspect ratio slot, the optimum length of the slot is λ/2 (scaled King-Middleton) at 125 GHz. i.e. its length is about 0.02". If a 10:1 aspect ratio slot were actually used, this would be inconveniently narrow. In practice a 0.004" wide slot is proposed (5:1 aspect ratio) it is thought that this change from 10:1 to 5:1 aspect ratio will have only a small effect on the impedance, but that it will be compatible with the Mullard diode which may be mounted flip-chip fashion with the minimum of bonding inductance (FIG. 10).

The admittance of the mixer diodes and the predicted match from a slot can be calculated using a suitable computer program while a Smith chart can be used to optimise the bond wire inductance to give, in association with the open circuit stub, good matching of the local oscillator to the two mixer diodes (seen in parallel by the local oscillator). In addition to matching the local oscillator to the diodes, it is also necessary to split the power to feed individual mixers. For this purpose an array of Wilkinson dividers or couplers may be provided. It is considered that the necessary matching stubs and the splitters could be manufactured on a 0.003" Quartz substrate glued into position on the periphery of the slot. If Wilkinson splitters were used the resistors could be manufactured as part of the nichrome layer. The spacing of the slots in an array would be a function of the lens, and the required resolution, but it is unlikely that there will be sufficient space for a microwave IF amplifier. Instead, it is proposed that multi-section λ/4 transformers be provided on the substrate, in order to feed separate amplifiers. A suitable amplifier might have a frequency band of e.g. 2-4 GHz. A drawing of the overall assembly is given in FIG. 11.

If this assembly were to be mass produced, it seems possible that it could be manufactured on a single substrate, by use of a sputtered thin quartz dielectric layer on top of the substrate containing the slots. This would be followed by a nichrome layer for adhesion and the resistors for the Wilkinson dividers, and a final gold metalisation.

The design of the radiometric array at 95 GHz illustrates what is possibly close to the upper limit of the proposed techniques at the present time. The second example i.e. that of a 5-10 GHz array is probably close to the lower limit, in terms of practical lens size.

Figure 13:
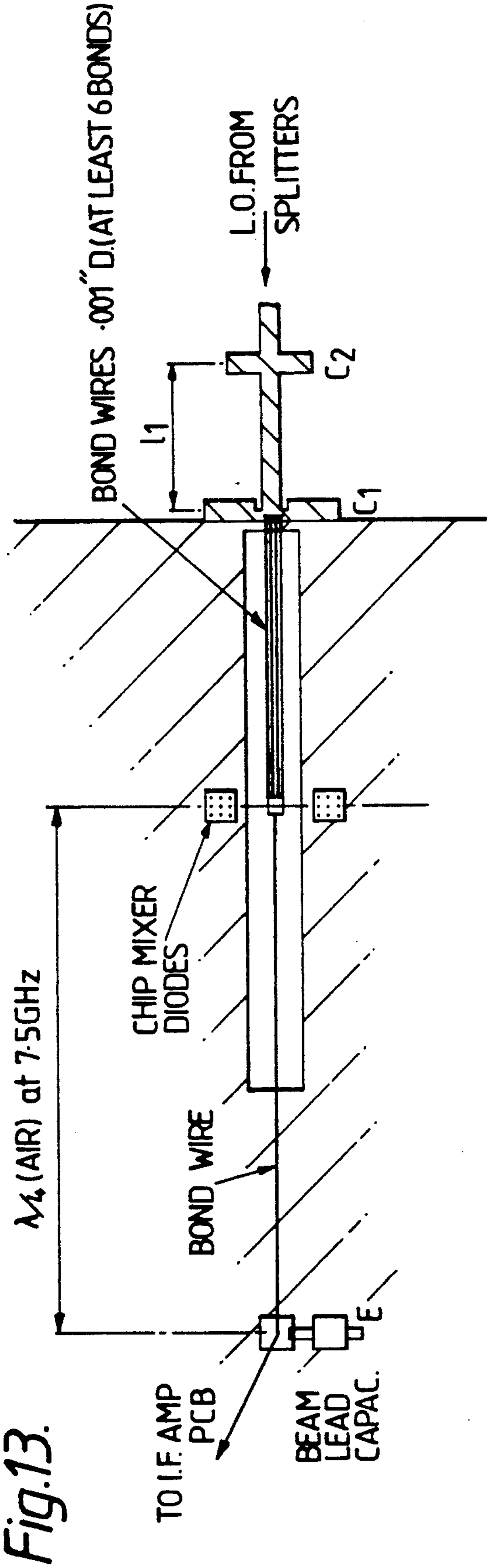
FIG. 13 shows a 5–10 GHz mixer element.

For this array the slot size is much larger (0.4 inch ×0.04) as is the size of the diodes (FIG. 13). The alpha DMG 6412A diodes are considered suitable for this application. It is proposed to use the diodes under heavily biased conditions, such that the RF of the diodes is approximately 100$. While this condition is necessary from the point of view of matching the signal to the mixer, it does not aid the local oscillator matching condition. In order to match the local oscillator to this circuit over the full band of 5-10 GHz it is found that 6 bonds (using 0.001 bond wire) would be necessary.

Even then it is necessary to use two shunt capacitative stubs in order to match the local oscillator.

Assuming a total bond-wire inductance of 1 mH can be achieved, then the length of the first stub forming C1, is approximately 0.1 λ, and that of C2 is approximately 0.08λ, and the separation 0.25λ, where λ is the wave length in microstrip at 10 GHz. A further complication is caused by the need for splitters. In order to cover 5-10 GHz, two section Wilkinson splitters will be required, and the resistors could be either of thin or thick film construction.

For purposes of IF amplification, this circuit would conveniently interface with a wide range of modular amplifiers which are on the market.

Figure 14:
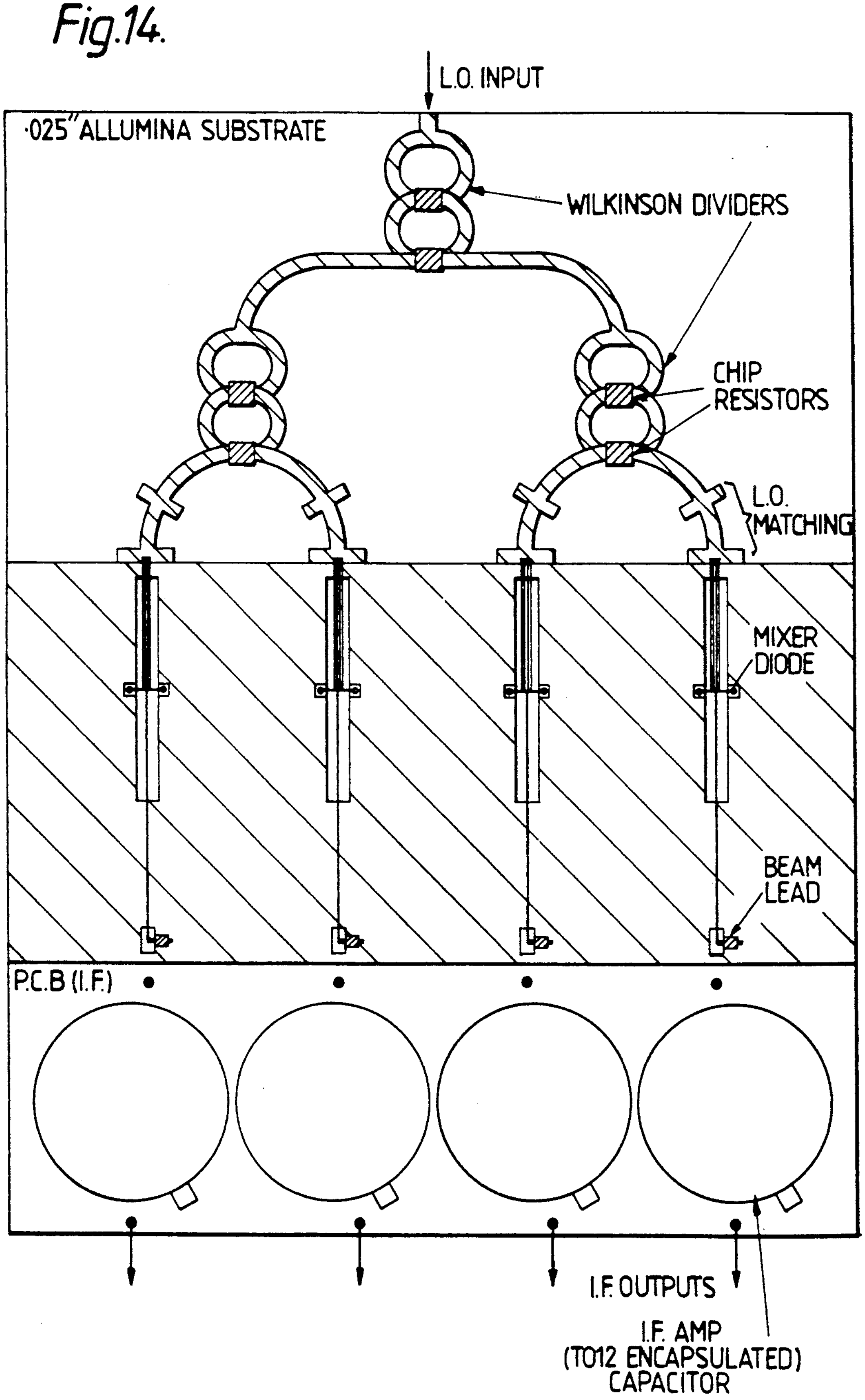
FIG. 14 shows a 5–10 GHz linear array of mixers, each of FIGS. 15 to 18 shows a respective further embodiment of a slot antenna/mixer with directly injected local oscillator signals, and in each case showing, by a further diagram in the case of FIGS. 15, 17 and 18, how the embodiment is adapted for fundamental and harmonic operation.

At the frequency under consideration the separation of the antenna elements would possibly allow the use of TO12 encapsulated amplifiers mounted on a P.C.B. The complete assembly for a linear array is shown in FIG. 14.

FIGS. 15 to 18 show further embodiments in accordance with the invention of antenna/mixers using slot antennae and directly injected locally oscillator signals.

Figure 19:
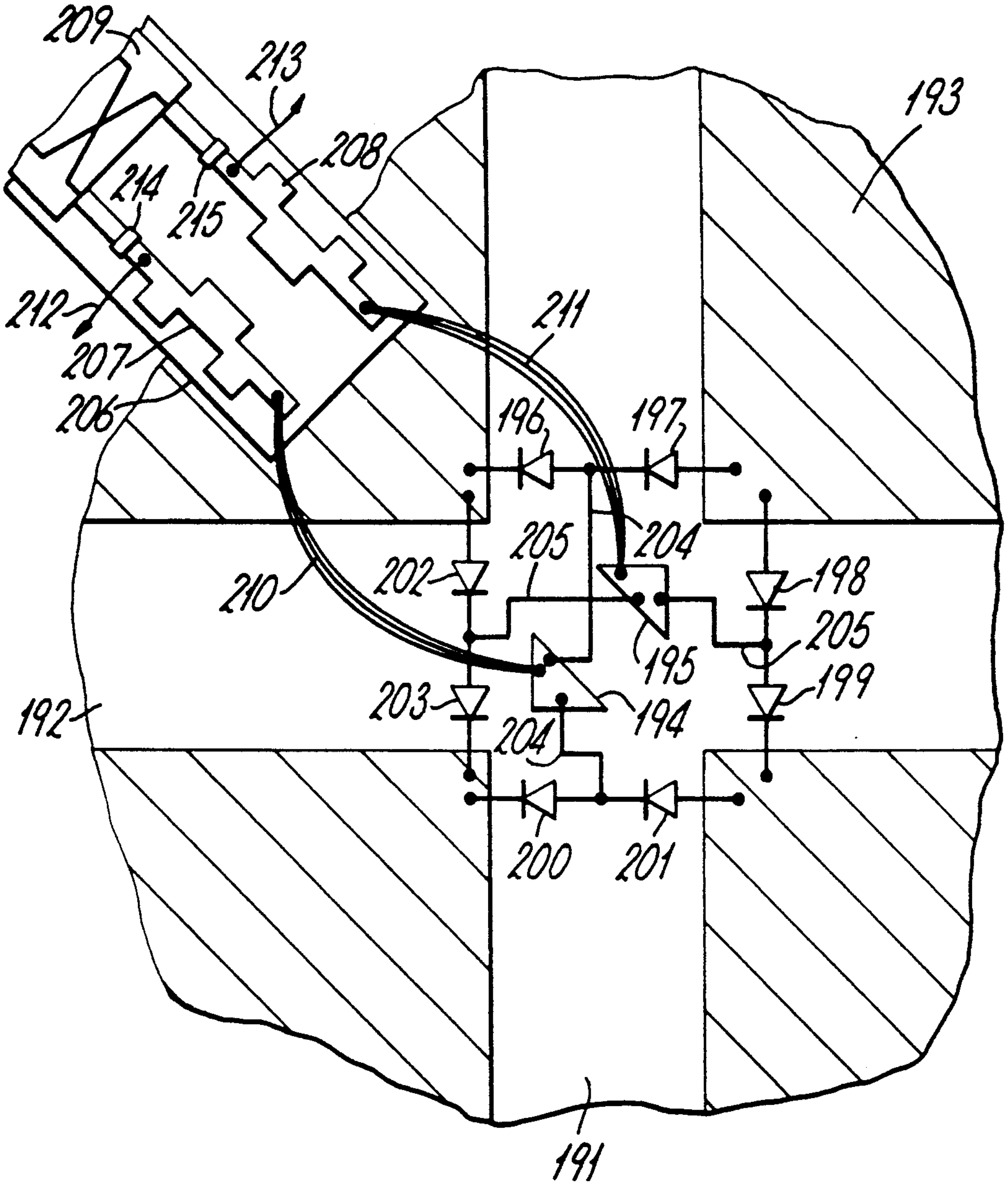
FIG. 19 is a diagram of an antenna/mixer responsive to circularly polarised radiation.

FIG. 19 shows an integrated/antenna mixer circuit which, like the previous embodiment, would be supported, normally as one of an array of such circuits, on the rear face of a dielectric substrate through which incoming radiation is directed by a dielectric lens. The circuit comprises two crossed antenna slots 191 and 192 provided in a metallisation layer 193 on the substrate surface. Two small interconnection pads 194 and 195 are provided on the substrate surface in the space formed by the junction of the slots 191 and 192 and respective pairs of series connected diodes 196/197, 198/199, 200/201, and 202/203 are connected across the slots near the junction thereof. Thus the diode paids 196/197 and 200/201 are connected across slot 191 near and at respective sides of the junction while diode pairs 198/199 and 202/203 are connected across slot 192 again near and at respective sides of the junction. The interconnection point between diodes 196 and 197 and the interconnection point between diodes 200 and 201 are each connected via bond wires 204 to pad 194. Similarly, diode 198/199 and 202/203 interconnection points are connected via bonds 205 to pad 195. A dielectric circuit-supporting substrate 206 is fixed, on top of the metalisation layer 193, so that it extends between two adjacent arms of the crossed slots 191 and 192. The substrate supports metalised patterns, 207 and 208 forming respective local oscillator matching circuits which are fed by a 90° coupler 209 (which could be a Lange coupler, for example and could comprise, depending in the frequency band to be covered, a commercially available component or a custom circuit made up on the substrate 206) and which supply respective quadrature local oscillator signals via respective bond wires 210 and 211 (or groups thereof as shown to achieve better matching) to the pads 194 and 195. As a result of this arrangement, the FIG. 19 circuit produces two IF signals, one indicative of incoming radiation components polarised in a direction to which the slot 191 is responsive and the other indicative of components polarised in the direction to which lost 192 is responsive. The two IF signals are fed out to the matching circuits on substrate 206 via bonds 210 and 211 and extracted via bonds 212 and 213 connected to the antenna/mixer side of respective capacitive elements 214 and 215 incorporated in the matching circuits. The two IF signals are then dealt with as required—for example, they can simply be added together to give a signal indicative of circularly polarised radiation received by the receiver of which the antenna/mixer circuit forms part. In addition or alternatively, the resultant of the two IF signals can be extracted so as to indicate the direction of polarisation of a linearly polarised received signal.

The quadrature relationship between the local oscillator signal components injected into the antenna/mixer circuit of FIG. 19 applies in the case, which is assumed of a fundamental antenna/mixer. For a harmonic mixer, i.e. where the extracted IF signal is derived from the received RF signal and the nth harmonic of the local oscillator signal, the phase difference between the respective local oscillator signal components is 90°/n, the illustrated 90° coupler 209 being replaced or adapted as appropriate. For a first harmonic mixer for example, the phase difference should be 45° and this can be achieved by replacing coupler 209 with an adaption of a Wilkinson divider metallised on the substrate 206.

The local oscillator feed and IF extraction circuit of FIG. 19 can, of course, be modified in a number of ways. For example, instead of providing the single, diagonally positioned substrate 206, two circuit carrying substrate (not shown) can be provided at the ends of adjacent slot arms.

Figure 20:
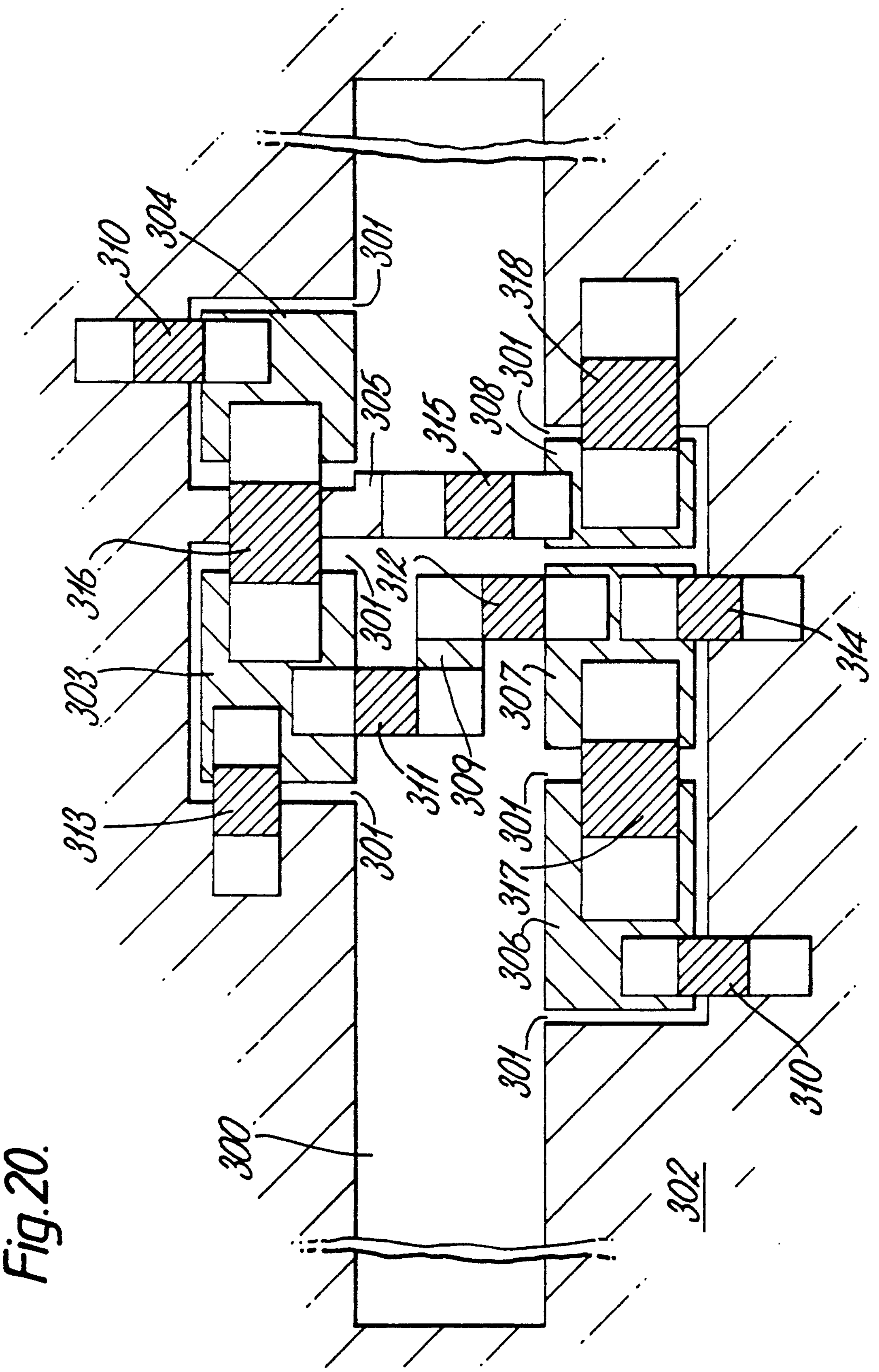
FIGS. 20 and 21 are respectively a plan view and an equivalent circuit diagram of an antenna/mixer incorporating an attenuator.
Figure 21:
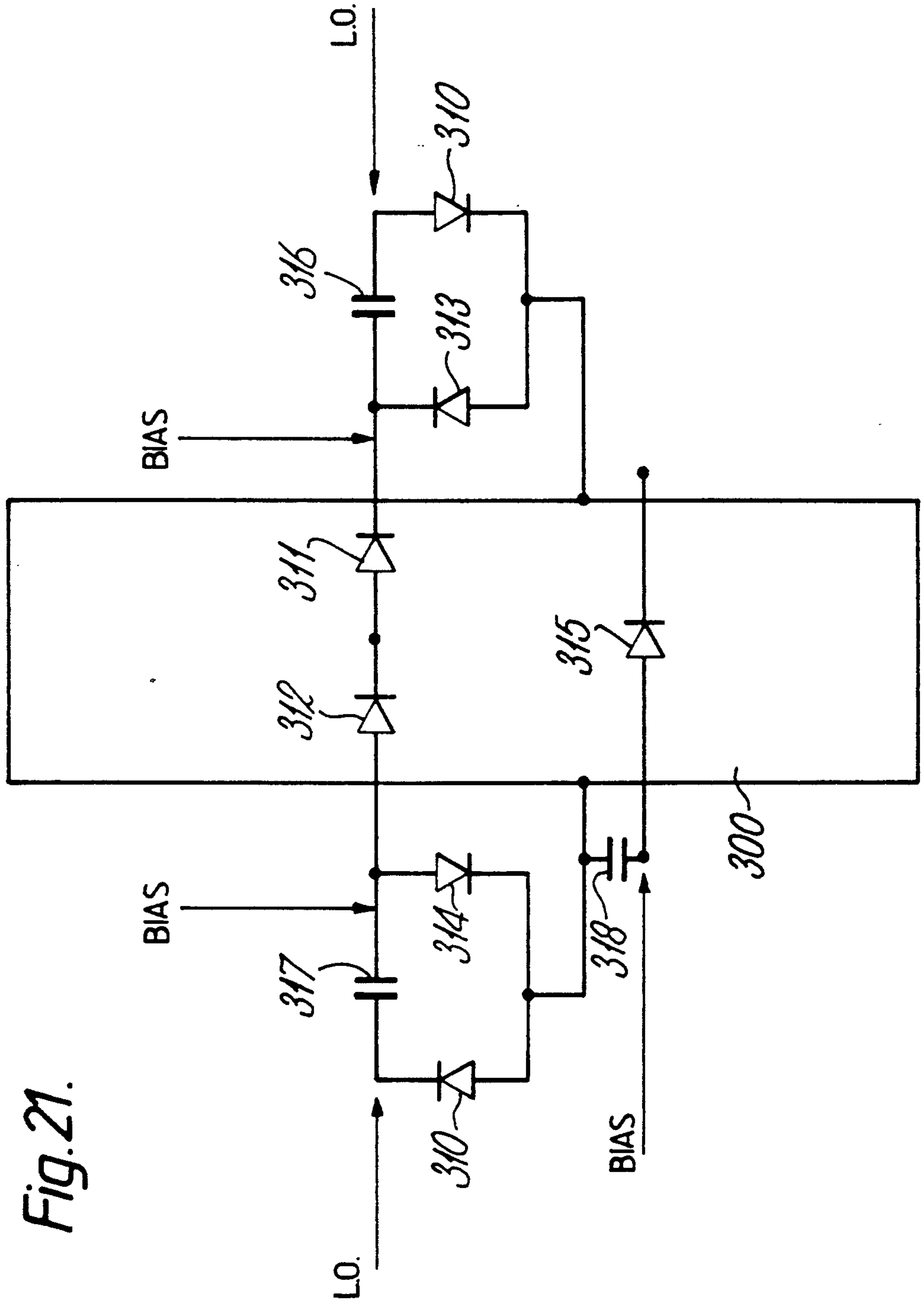

FIGS. 20 and 21 illustrate an implementation and an equivalent electrical diagram of a single-balanced antenna/mixer circuit incorporating attenuators for matching the local oscillator power to the mixer requirements and to give protection to the mixer and associated circuits in the case where the receiver forms part of a radar system including an adjacent transmitter from which comparitively powerful pulses of outgoing radiation are emitted, and portions of which may be received directly by the receiver. As shown in FIG. 20, the antenna/mixer circuit comprises a single slot antenna 300, from about the middle of which there extend narrow channels or gaps 301 in the metallisation layer 302 around the slot to form, at one side of the slot two interconnection pads 303 and 304 with a portion 305 of the metallisation layer extending between them to the side of the slot and, at the other side of the slot, three adjacent interconnection pads 306, 307 and 308. A small further pad 309 is positioned in the slot between pads 303 and 307. Two mixer diodes 310 are connected between the metallisation layer 302 and respective ones of the pads 304 and 306. Five PIN diodes 311 to 315 are respectively connected one between the pads 303 and 309, one between the pads 309 and 307, one between pad 303 and the metallisation layer 302, one between pad 307 and the metallisation layer, and one between the pad 308 and the extending portion 305 of the metallisation layer. Three capacitors 316, 317 and 318 are connected one between pads 303 and 304, one between pads 306 and 307 and one between pad 308 and the metallisation layer. A local oscillator signal is applied via wire bonds (not shown) to each of the pads 304 and 306 which diode bias signals are applied to each of the pads 303, 307 and 308. As shown in FIG. 21, the FIG. 20 arrangement is equivalent to a slot with series PIN diode paid 311/312 and PIN diode 315 connected across it. Along with the capacitors 316 to 318, the PIN diodes constitute a Pie-type attenuator which is effectively connected between the two mixer diodes 310 and 311. The attenuator reduces the signal, formed by the slot antenna in response to the incoming RF signal, before this is mixed with the local oscillator signal while not reducing the local oscillator signal power.

Although the attenuator is shown integrated into a single-slot, single-balanced mixer, it could also be incorporated into other antenna/mixer circuit embodiments described herein including the circular polarisation responsive embodiment of FIG. 19. Some adaptation of the attenuator may be required to suit the particular case. Also, instead of providing the channel 301 to define the pads which in some cases may, braking up the slot periphery, cause antenna pattern problems, the various diodes, capacitors and connection pads maybe provided on dielectric circuit substrates of 'chips' affixed over the metallisation layer 302 next to the slot.

I claim:

1. An electromagnetic radiation receiver comprising:

a dielectric substrate;

a planar integrated antenna/mixer circuit formed on a face of the substrate, focussing means positioned for focussing received RF radiation onto the antenna/mixture circuit, and local oscillator signal supply means for injecting a local oscillator signal to the antenna/mixer circuit via a microstrip line, the antenna/mixer comprising a slot antenna, non-linear means connected to the antenna for mixing the RF radiation received by the antenna with the local oscillator signal injected to the antenna/mixer circuit to form an IF signal, and output means for extracting said IF signal from the antenna/mixer circuit; and said non-linear means is a single diode connected across the slot antenna;

wherein the microstrip line through which the local oscillator signal is applied comprises filter forming stubs.

2. An electromagnetic radiation receiver comprising:

a dielectric substrate;

a planar integrated antenna/mixer circuit formed on a face of the substrate, focussing means positioned for focussing received RF radiation onto the antenna/mixer circuit, and local oscillator signal supply means for injecting a local oscillator signal to the antenna/mixer circuit, and the antenna/mixer comprising a slot antenna, non-linear means connected to the antenna for mixing the RF radiation received by the antenna with the local oscillator signal injected to the antenna/mixer circuit to form an IF signal, and output means for extracting said IF signal from the antenna/mixer circuit, wherein the antenna mixer circuit comprises a pair of crossed slot antenna elements means for supplying two local oscillator signals so that two IF signals are formed.

3. A receiver according to claim 2 wherein the two local oscillator signals are supplied in quadrature.

* * * * *